United States Patent
Zhao et al.

(10) Patent No.: US 8,735,004 B2
(45) Date of Patent: May 27, 2014

(54) OVERCHARGE INHIBITOR, AND NONAQUEOUS ELECTROLYTE SOLUTION AND SECONDARY BATTERY USING THE SAME

(75) Inventors: Jinbao Zhao, Ibaraki (JP); Norio Iwayasu, Hitachinaka (JP); Yuki Okuda, Hitachi (JP); Hidetoshi Honbo, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 650 days.

(21) Appl. No.: 12/858,484

(22) Filed: Aug. 18, 2010

(65) Prior Publication Data
US 2011/0189550 A1 Aug. 4, 2011

(30) Foreign Application Priority Data
Feb. 3, 2010 (JP) ................................. 2010-021700

(51) Int. Cl.
*H01M 10/056* (2010.01)
*H01M 10/0567* (2010.01)
*H01M 10/0568* (2010.01)

(52) U.S. Cl.
USPC ......................................... 429/324; 252/62.2

(58) Field of Classification Search
None
See application file for complete search history.

(56) References Cited

U.S. PATENT DOCUMENTS

| 4,447,515 A * | 5/1984 | Kondo et al. | 430/83 |
| 5,434,021 A * | 7/1995 | Fauteux et al. | 429/213 |
| 5,776,627 A | 7/1998 | Mao et al. | |
| 6,033,797 A | 3/2000 | Mao et al. | |
| 2010/0216029 A1 * | 8/2010 | Iwayasu | 429/304 |

FOREIGN PATENT DOCUMENTS

| EP | 0 776 058 | 5/1996 |
| EP | 1 361 622 | 11/2003 |
| JP | 07-302614 | 11/1995 |
| JP | 09-171840 | 6/1997 |
| JP | 10-321258 | 12/1998 |
| JP | 3275998 | 2/2002 |
| JP | 2009-211941 | * 9/2009 |

OTHER PUBLICATIONS

Guoying Chen et al., Overcharge Protection for High Voltage Lithium Cells Using Two Electroactive Polymers, Electrochemical and Solid-State Letter, 9 (1), A24-A26 (2006).
EP Search Report of Appln. 10172601.6 dated Dec. 16, 2010 in English.

* cited by examiner

Primary Examiner — Jonathan Crepeau
(74) Attorney, Agent, or Firm — Antonelli, Terry, Stout & Kraus, LLP.

(57) ABSTRACT

An overcharge inhibitor is provided which increases an internal resistance of a battery, being electropolymerized by reaction with a positive electrode at a high potential in overcharging.

The overcharge inhibitor is produced by using a polymer containing a polymerizable monomer as a repeating unit. The polymerizable monomer has a functional group that is electropolymerized at a potential of 4.3 to 5.5 V based on a lithium metal reference.

13 Claims, 5 Drawing Sheets

OVERCHARGE INHIBITOR, AND NONAQUEOUS ELECTROLYTE SOLUTION AND SECONDARY BATTERY USING THE SAME

CLAIM OF PRIORITY

The present application claims priority from Japanese Patent application serial No. 2010-021700, filed on Feb. 3, 2010, the content of which is hereby incorporated by reference into this application.

BACKGROUND OF THE INVENTION

1. Field of the Invention

The present invention relates to an overcharge inhibitor, and a nonaqueous electrolyte solution and a secondary battery using the same.

2. Description of Related Art

A lithium-ion secondary battery containing a nonaqueous electrolyte solution (a nonaqueous electrolyte solution secondary battery) has been widely used in the field of portable information equipment and the like because of high voltage (operating voltage of 4.2 V) and high energy density. The demands for such a lithium-ion battery have grown rapidly. Currently, the lithium-ion secondary battery establishes the position of a standard cell for a mobile information equipment including a cellular phone and a notebook computer.

The lithium-ion secondary battery includes a positive electrode, a negative electrode and a nonaqueous electrolyte solution as components. In particular, the general lithium secondary battery uses a lithium composite metal oxide typified by $LiMO_2$ (where M contains one or more kinds of metal elements selected from the group consisting of Co, Ni and Mn) as the positive electrode. Further, the lithium secondary battery uses a carbon material or an intermetallic compound containing Si, Sn or the like as the negative electrode, and a nonaqueous solution dissolving an electrolyte salt in a nonaqueous solvent (organic solvent) as the electrolyte solution.

The nonaqueous solvents generally used include carbonates, such as ethylene carbonate (EC), propylene carbonate (PC), dimethyl carbonate (DMC) and diethyl carbonate (DEC).

When such a lithium secondary battery is overcharged to exceed the normal operating voltage (for example, 4.2 V in full charge in the case of $LiCoO_2$), excessive lithium ions are extracted from the positive electrode, and excessive lithium is deposited in the negative electrode to form dendrite at the same time. Both electrodes, namely, the positive and negative electrodes chemically become unstable to gradually react with the carbonates in the nonaqueous solution, and cause a sudden exothermal reaction by decomposition or the like. Thus, the entire battery abnormally generates heat, which disadvantageously impairs the safety of the battery.

Normally, measures are taken to prevent the overcharge by use of a protective circuit or the like so as not to cause an internal short-circuit, which does not lead to the abnormal state. However, a battery charger or the protective circuit may be broken down. In case of breakdown, the safety of the battery is required even when the battery itself is overcharged. In particular, this problem becomes important as the energy density and capacity of the battery increases.

In order to solve such a problem, a technique is proposed which ensures the safety of the battery against the overcharge by adding a small amount of an aromatic compound as an additive to an electrolyte solution as disclosed in Japanese Patent Publication No. 3275998 (Patent Document 1), Japanese Patent Laid-openNo. Hei 09 (1997)-171840 (Patent Document 2), Japanese Patent Laid-open No. Hei 10 (1998)-321258 (Patent Document 3), Japanese Patent Laid-open No. Hei 07 (1995)-302614 (Patent Document 4), and "Electrochemical and Solid-State Letters, 9 (1), A24-A26 (2006)" (Non-Patent Document 1).

The techniques disclosed in Patent Documents 1 to 3 are designed to use cyclohexyl benzene, biphenyl, 3-R-thiophene, 3-chlorotiophene, furan or the like dissolved in an electrolyte solution so as to ensure the safety of the lithium-ion battery itself in overcharging. The use of such an electrolyte solution generates gas in the battery at the time of overcharge to operate an internal electricity breaking device, or generates a conductive polymer or the like, thus preventing the overcharge of the battery.

Patent Document 4 discloses a nonaqueous electrolyte secondary battery including an organic compound with a π-electron orbit which has a molecular weight of 500 or less, and which has a reversible oxidation reduction potential nobler than the positive electrode potential in full charge of the battery. In Patent Document 4, an anisole derivative or the like is exemplified as the above organic compound.

Non-Patent Document 1 discloses the technique that the overcharge can be suppressed by adding a thiophene based polymer having an electric activity and having about several thousands of molecular weight to an electrolyte solution. The polymers include, for example, poly(3-butylthiophene), and poly(3-phenylthiophene).

SUMMARY OF THE INVENTION

An overcharge inhibitor according to the present invention contains a polymerizable monomer as a repeating unit. The polymerizable monomer has a functional group that is electropolymerized at a potential of 4.3 to 5.5 V based on a lithium metal reference at least.

According to the present invention, the overcharge can be suppressed by increasing the internal resistance of the secondary battery at the time of overcharge of the battery.

The present invention can provide the overcharge inhibitor that is electropolymerized at a high potential, and also the secondary battery with excellent safety.

DETAILED DESCRIPTION OF THE PREFERRED EMBODIMENTS

Figure 1:
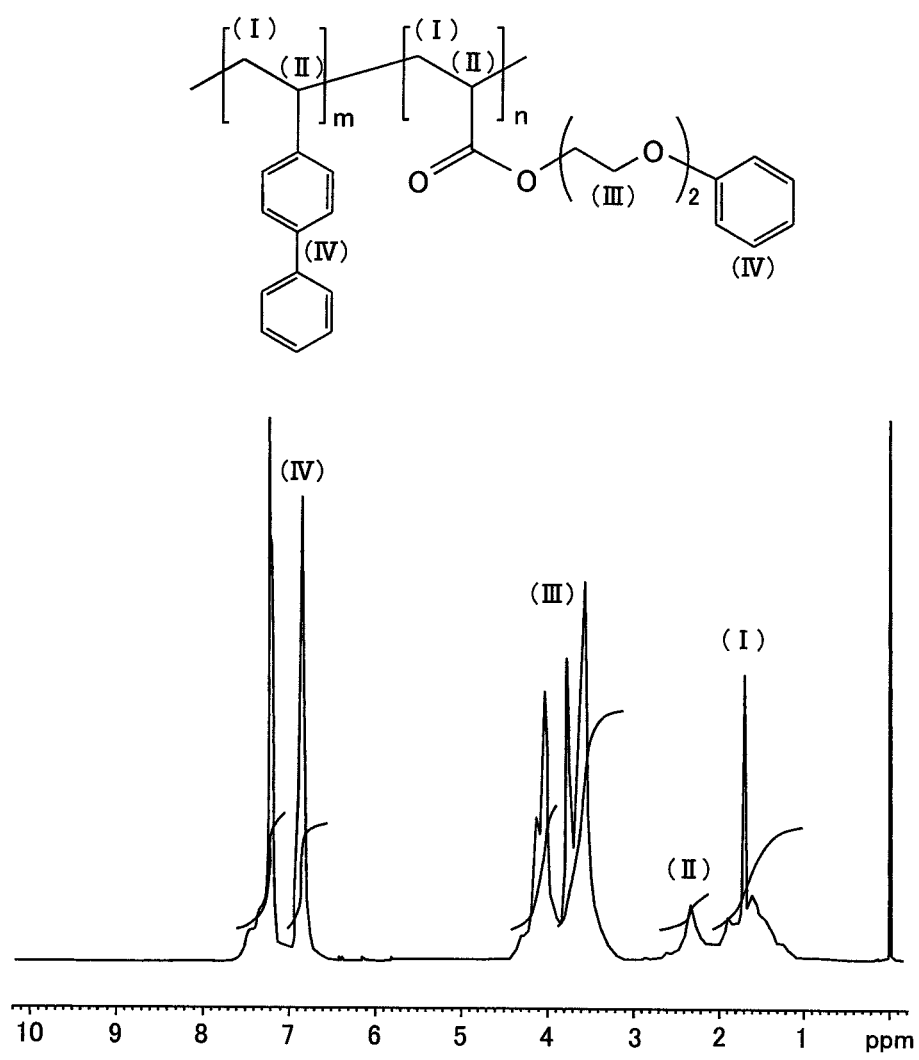
FIG. 1 is a graph showing $^1$H-NMR spectrum of a polymer for a nonaqueous electrolyte secondary battery of an embodiment.

The present invention relates to an overcharge inhibitor which is a polymer with an aromatic group in a molecule, a nonaqueous electrolyte solution containing the overcharge inhibitor dissolved therein. Further, the present invention also relates to a nonaqueous electrolyte solution secondary battery (which is also referred to as a lithium secondary battery, or a secondary battery or a battery merely) with enhanced safety containing the nonaqueous electrolyte solution.

It is an object of the present invention to provide the overcharge inhibitor that suppresses the overcharge by increasing an internal resistance of the secondary battery, being electropolymerized by reaction with a positive electrode whose potential becomes high at the time of the overcharge of the secondary battery.

The following will describe the overcharge inhibitor, and a nonaqueous electrolyte solution and a secondary battery using the same according to an embodiment of the present invention.

The overcharge inhibitor has a polymerizable monomer as a repeating unit, and is represented by the following chemical formula (1).

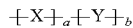  (1)

where X is one polymerizable monomer and indicates a functional group that is electropolymerized at a potential of 4.3 to 5.5 V based on a lithium metal reference, Y is the other polymerizable monomer, includes an ether bond or an ester bond, and may be the above X. Further, subscript "a" is an integer number of 1 or more and subscript "b" is 0 or an integer number of 1 or more.

Each of the X and Y units of the overcharge inhibitor has a double bond between carbon atoms (carbon-carbon (C=C) unsaturated bond).

Each of the X and Y units of the overcharge inhibitor contains a vinyl group (ethenyl group) or a propenoate group. A compound having the propenoate group is called acrylate. The vinyl group is —$CH_2$—$CHR''$— ($R''$ is an arbitrary functional group.) in the polymer. The propenoate group is —$CH_2$—$CHR''$—CO—O— ($R''$ is an arbitrary functional group.) in the polymer.

Each of the X and Y units of the overcharge inhibitor is represented by the following chemical formula (2) or (3).

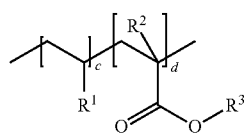  (2)

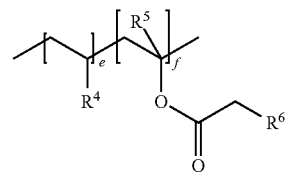  (3)

where each of $R^1$ and $R^4$ is a functional group having an aromatic ring represented by any one of the following chemical formulas (4) to (6), and each of $R^2$ and $R^5$ is an alkyl group having the carbon number of 1 to 3 in which a hydrogen atom of the alkyl group may be substituted by a fluorine atom. $R^3$ is a group having an alkyl group having the carbon number of 1 to 6 or an aromatic group in which a hydrogen atom of the alkyl group or aromatic group may be substituted by a fluorine atom. Alternatively, $R^3$ may be an alkyl group having the carbon number of 1 to 6 or aromatic group via an alkoxy group represented by the following chemical formula (7). $R^6$ is a functional group having an alkyl group having the carbon number of 1 to 6 or aromatic ring in which a hydrogen atom of the functional group having the alkyl group or aromatic group may be substituted by a fluorine atom. Further, each of subscripts "c" and "e" is an integer number of 1 or more, and each of subscripts "d" and "f" is 0 or an integer number of 1 or more.

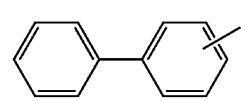  (4)

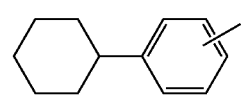  (5)

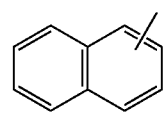  (6)

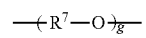  (7)

where $R^7$ is an alkyl group having the carbon number of 2 to 6 or a phenylene group in which a hydrogen atom of the alkyl group or phenylene group may be substituted by a fluorine atom. Further, subscript "g" is an integer number of 1 to 10.

At least one of the X and Y of the overcharge inhibitor is preferably selected from the group consisting of the following chemical formulas (8) to (10):

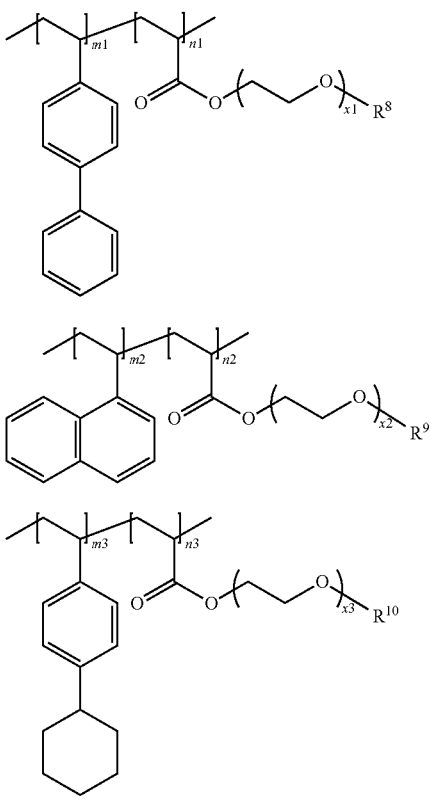

(8), (9), (10)

where each of subscripts "x1 to x3" is an integer number of 1 to 10, each of subscripts "m1 to m3" is an integer number of 1 or more, and each of subscripts "n1 to n3" is 0 or an integer number of 1 or more. Further, each of $R^8$ and $R^{10}$ is a functional group having an alkyl group having the carbon number of 1 to 6 or an aromatic ring in which a hydrogen atom of the functional group of the alkyl group or aromatic group may be substituted by a fluorine atom.

At least one of the X and Y of the overcharge inhibitor is preferably selected from the group consisting of the following chemical formulas (11) to (13):

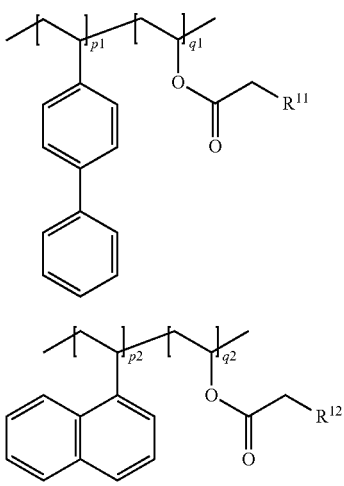

(11), (12)

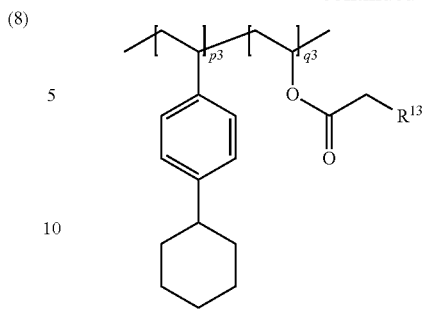

(13)

where each of subscripts "p1 to p3" is an integer number of 1 or more, and each of subscripts "q1 to q3" is 0 or an integer number of 1 or more. Further, each of $R^{11}$ to $R^{13}$ is a functional group having an alkyl group having the carbon number of 1 to 6 or an aromatic ring in which a hydrogen atom of the functional group having the alkyl group or aromatic group may be substituted by a fluorine atom.

The nonaqueous electrolyte solution includes a nonaqueous solvent, an electrolyte salt, and the above overcharge inhibitor.

The electrolyte salt of the nonaqueous electrolyte solution contains a lithium salt.

The nonaqueous solvent of the nonaqueous electrolyte solution contains a cyclic carbonate or a chain carbonate.

The secondary battery includes a positive electrode, a negative electrode, a separator, and the above nonaqueous electrolyte solution.

The positive electrode and the negative electrode of the secondary battery are capable of storing and releasing lithium.

The above components of the secondary battery according to the present invention will be described in more detail below.

The polymerizable monomer which is a raw material of X in the above chemical formula (1) is not limited to a specific one as long as the monomer has a carbon-carbon (C=C) unsaturated bond, and a functional group that can be electropolymerized at 4.3 to 5.5 V based on the lithium metal reference.

The polymerizable monomer having an organic group with the carbon-carbon unsaturated bond such as a vinyl group, an allyl group, an acrylonitrile group or a methacrylonitrile group is suitable for use. The monomer desirably has one carbon-carbon unsaturated bond. This is because two or more carbon-carbon unsaturated bonds are not dissolved in the electrolyte solution due to an intramolecular cross-linking reaction.

The above polymerizable monomer which is a raw material of Y is a polymerizable monomer having an ether bond or ester bond.

The polymer having the ether or ester bond in a molecule has high compatibility with the nonaqueous solvent and the electrolyte salt, and thus can be easily dissolved in the electrolyte solution and suppress an increase in viscosity of the electrolyte solution.

The polymerizable monomer (which is a raw material of Y) enhances the solubility into the electrolyte solution. As long as the polymerizable monomer has the carbon-carbon (C=C) unsaturated bond, the monomer which is a raw material of Y is not limited to a specific one, and may be the monomer which is a raw material of X.

The monomer which is a raw material of X or Y desirably contains one carbon-carbon (C=C) unsaturated bond. Examples of the monomer include acrylate based monomers such as ethoxy phenyl acrylate (EO=1 to 10 moles) having an ethylene oxide (EO), methyl acrylate, ethyl acrylate, 2-ethylhexyl acrylate, cyclohexylacrylate, diethyleneglycolmono-2-ethylhexyl ether acrylate, diethylene glycol monophenyl ether acrylate, tetraethylene glycol monophyenyl ether acrylate, lauryl acrylate, methyl methacrylate, ethyl methacrylate, lauryl methacrylate, iso-bornyl acrylate, iso-bornyl methacrylate, 2-phenoxy ethyl acrylate, tetra hydro furfuryl acrylate, 2-hydroxy propyl acrylate, benzyl acrylate, ethoxy phenyl methacrylate (EO=1 to 10 moles), tetra hydro furfuryl methacrylate, benzyl methacrylate, cyclohexyl methacrylate and 2-(2,4,6-tribromo phenoxy)ethyl acrylate. Further, examples of the monomer include allyl ethers typified by allyl benzyl ether, allyl alkyl ether or the like; and organic or inorganic ester of carboxylic acid having an allyl group typified by allyl acetate, allyl benzoate, allyl octyl oxalate, allyl propyl phthalate, allyl alkyl carbonate, allyl alkyl fumarate, allyl alkyl isophthalate, allyl alkyl malonate, allyl alkyl oxalate, allyl alkyl phthalate, allyl alkyl sebacate, diallyl succinate, allyl alkyl terephthalate, allyl alkyl tartrate, ethyl allyl malate, methyl allyl fumarate, methyl meta-allyl malate, allyl meta-sulfonate, allyl methyl sulfate or the like. Moreover, examples of the monomer include vinyl monomers typified by vinyl acetate, vinyl propionate, trifluoro vinyl acetate, vinyl propionate and vinyl pivalate.

Among them, the alkyl acrylate (methacrylate) having the carbon number of 1 to 3, allyl alkyl ether, ethoxy phenyl acrylate (EO=0 to 5 moles), ethoxy methyl acrylate (EO=0 to 5 moles), and vinyl acetate are particularly desirable.

The functional group of the above X that can be electropolymerized at 4.3 to 5.5 V based on the lithium metal reference is an aromatic group.

The polymer represented by the above chemical formula (1) serves as the overcharge inhibitor by electrolytic polymerization of the aromatic group, and reacts at a predetermined voltage to inhibit the overcharge. The reaction occurs at a voltage exceeding the operating voltage of the battery. Specifically, the voltage is 4.3 to 5.5 V on the basis of lithium metal reference.

The aromatic group has the total carbon number of 7 to 18 satisfying the Huckel's rule.

Specifically, examples of the aromatic group include a functional group derived from an aromatic compound including alkyl biphenyl such as a biphenyl and 2-methyl biphenyl, terphenyl, a partial hydride of terphenyl, cyclopentyl benzene, cyclohexyl benzene, t-butylbenzene, t-amylbenzene, diphenyl ether, naphthalene and dibenzofulan; a partial fluorinated functional group derived from an aromatic compound including 2-fluorobiphenyl, 3-fluorobiphenyl, 4-fluorobiphenyl, 4,4'-difuluorobiphenyl, o-cyclohexyl fluorobenzene, p-cyclohexyl fluorobenzen; and a functional group derived from a fluorine-containing anisole compound including 2,4-difluoroanisole, 2,5-difurulroanisole, 2,6-difluoroanisole, 3,5-difluoroanisole and the like.

A part of the aromatic group may be substituted by another one. The aromatic group may contain elements other than carbon in an aromatic ring. Specifically, the elements include S, N, Si, O and the like.

From the viewpoint of improving the safety of the battery in the overcharge and the characteristics of the battery, examples of the preferable aromatic groups among them include an aromatic group derived from alkyl biphenyl including biphenyl and 2-methylbiphenyl, terphenyl, a partial hydride of terphenyl, cyclopentyl benzene, cyclohexyl benzene, t-butylbenzene, t-amylbenzene, diphenyl ether and dibenzofulan; a partial fluorinated functional group derived from an aromatic compound including 2-fluorobiphenyl, 3-fluorobiphenyl, 4-fluorobiphenyl, 4,4'-difuluorobiphenyl, o-cyclohexyl fluorobenzene and p-cyclohexyl fluorobenzen; and a naphthyl group.

The term "polymer" as used therein means a compound obtained by polymerization of the above polymerizable monomers.

From the viewpoint of electrochemical stability, it is preferable that the polymerzable monomers are previously polymerized to make a polymer, thereafter refined, and used.

From the viewpoint of cost of synthesis of materials and solubility in the electrolyte solution etc., the polymer containing the above X and Y units particularly preferably contains a cyclohexyl benzyl group, a biphenyl group or a naphthyl group, and contains a repeating unit represented by the chemical formulas (2) and (3).

Each of the $R^1$ and $R^4$ is a functional group having an aromatic ring represented by any one of the above chemical formulas (4) to (6), and each of the $R^2$ and $R^5$ is an alkyl group having the carbon number of 1 to 3 in which a hydrogen atom of the alkyl group may be substituted by a fluorine atom. The $R^3$ is a group having an alkyl group having the carbon number of 1 to 6 or an aromatic group in which a hydrogen atom of the alkyl group or aromatic group may be substituted by a fluorine atom.

The $R^3$ may be the alkyl group with the carbon number of 1 to 6 or the aromatic group via an alkoxy group represented by the above formula (7). The $R^6$ is a functional group having an alkyl group having the carbon number of 1 to 6 or aromatic ring in which a hydrogen atom of the functional group having the alkyl group or aromatic group may be substituted by a fluorine atom. Further, each of the subscripts "c" and "e" are an integer number of 1 or more, and each of subscripts "d" and "f" are 0 or an integer number of 1 or more.

The $R^7$ in the above formula (7) is an alkyl group having the carbon number of 2 to 6 or a phenylene group in which a hydrogen atom of the alkyl group or phenylene group may be substituted by a fluorine atom. The subscript "g" is an integer number of 1 to 10. The end group of $R^7$ is not limited to a specific one, and may have an alkyl group or the like having the carbon number of 1 to 6 added thereto.

The polymer represented by the above chemical formula (2) or (3) is more preferably the polymer represented by the chemical formulas (8) to (13) from the viewpoint of the balance between material and performance.

Each of the subscripts "m1 to m3" and "p1 to p3" is an integer number of 1 or more. Each of the subscripts "n1 to n3" and "q1 to q3" is 0 or an integer number of 1 or more. Each of $R^8$ to $R^{13}$ is a functional group having an alkyl group having the carbon number of 1 to 6 or an aromatic ring in which a hydrogen atom of the functional group having the alkyl group or aromatic ring may be substituted by a fluorine atom. Each of the subscripts "x1 to x3" is an integer number of 1 to 10.

In the above chemical formula (1), the (a+b) indicates the length of a skeleton of the polymer (a bonding part between a X unit and a Y unit) where subscript "a" is an integer number of 1 or more, and subscript "b" is 0 or an integer number of 1 or more. In order to improve the characteristics of prevention of the overcharge, the molar ratio of X to Y is desirably as large as possible if the solubility of the polymer in the electrolyte solution can be ensured. However, when the ratio of X to Y is excessively large, the solubility of the polymer in the electrolyte solution may become low. Thus, it is important to achieve the balance among the molecular weight, the solubility, the overcharge characteristics and the like. Although depending on the molecular structure of the X and Y, the molar ratio of X to Y is preferably 0.1 to 10.

The X unit and Y unit within or between polymer molecules may be bonded together while forming respective blocks, or may be especially bonded in a random fashion. That is, in the polymer molecule represented by the chemical formula (1), the repeating numbers "a" and "b" of the X unit and Y unit may be not constant, and may be distributed in the same manner as the general polymer.

Although depending on the rate of X in the molecular and the molecular structure of the functional group thereof, the polymer content of the nonaqueous electrolyte solution is preferably 0.1% or more by mass relative to the total mass of the nonaqueous electrolyte solution, and more preferably 0.5% or more by mass from the viewpoint of more effectively exhibiting the effect of the polymer. When the polymer content of the nonaqueous electrolyte solution is excessive, the viscosity of the nonaqueous electrolyte solution becomes too high, which can result in reduction in load characteristics of the battery. The polymer content is preferably 10% or less by mass, and more preferably 5% or less by mass from the viewpoint of an increase in cost of the nonaqueous electrolyte solution.

The number average molecular weight (Mn) of the above polymer depends on the solubility of the polymer in the electrolyte solution and the viscosity of the electrolyte having the polymer, and thus is not limited to a specific one. The polymer may be an oligomer consisting of a few monomer units. The number average molecular weight of the polymer is preferably in a range of 3000 to 1000000. When the molecular weight of the polymer is excessively large, the solubility of the polymer in the electrolyte solution is reduced. As a result, the above polymer is not dissolved in the electrolyte solution, and the viscosity of the electrolyte solution is increased, which leads to reduction in battery performance. When the molecular weight of the polymer is excessively small, the refining of the polymer becomes difficult, and the rate of increase in an internal resistance of the battery after the overcharge possibly becomes slow.

The synthesis method of the above polymer is not limited to a specific one, and may be any one of a bulk polymerization, a solution polymerization, and an emulsion polymerization as known in the art. Especially, the solution polymerization is preferable.

The polymerization method is not limited to a specific one, but a radial polymerization is suitable for use. In the polymerization, a polymerization initiator may or may not be used. The radical polymerization initiator is preferably used from the viewpoint of the ease in handling. The polymerization using the radical polymerization initiator can be performed under normal conditions of a temperature range and a polymerization time.

The radical polymerization is preferably carried out in range of 30 to 90° C., mainly depending on the temperature for the half-life of ten hours of the radical polymerization initiator. The term "temperature for the half-life of ten hours" as used herein is an indicator of decomposition temperature and rate for the radical polymerization initiator, meaning the temperature at which the amount of the radical polymerization initiator having an initial concentration of 0.01 mol/L needs to be reduced by half in ten hours in a radical inactive solvent such as benzene.

The compounding amount of the radical polymerization initiator is in a rage of 0.1 to 5% by weight relative to the polymerizable compound, preferably 0.3 to 2% by weight.

The radical polymerization initiators include organic peroxides, such as t-butyl peroxypivalate, t-hexyl peroxypivalte, methyl ethyl ketone peroxide, cyclohexanone peroxide, 1,1-bis(t-butyl peroxy)-3,3,5-trimethyl cyclohexane, 2,2-bis(t-butylperoxy)octane, n-butyl-4,4-bis(t-butylperoxy)valerate, t-butyl hydroperoxide, cumene hydroperoxide, 2,5-dimethyl hexane-2,5-dihydroperoxide, di-t-butyl peroxide, t-butyl cumile peroxide, di-cumile peroxide, α,α-bis(t-butylperoxy m-isopropyl)benzene, 2,5-dimethyl-2,5-di(t-butylperoxy) hexane, benzoyl peroxide, and t-butyl peroxy propyl carbonate. Further, the radical polymerization initiators include azo compounds, such as 2,2'-azobis[2-(2-imidazoline-2-yl)propane], 2,2'-azobis{2-methyl-N-[1,1-bis(hydroxy methyl)-2-hydroxy ethyl]propionamide}, 2,2'-azobis{2-methyl-N-[1,1-bis(hydroxy methyl)ethyl]propionamide, 2,2'-azobis[2-methyl-N-(2-hydroxy ethyl)propionamide], 2,2'-azobis(2-methyl propionamide)dihydrate, 2,2'-azobis(2,4,4-trimethylpentane), 2,2'-azobis(2-methylpropane), dimethyl 2,2'-azobis isobutylate, 4,4'-azobis(4-cyano valeric acid), 2,2'-azobis[2-hydroxy methyl)propionitrile], and azobis isobutyronitrile.

The nonaqueous solvent (organic solvent) used for the nonaqueous electrolyte solution contains preferably one having a high dielectric constant, and more preferably an ester containing a carbonate. Among them, the nonaqueous solvent is recommended to use an ester having a dielectric constant of 30 or more.

Examples of such esters with the high dielectric constant include ethylene carbonate, propylene carbonate, butylene carbonate, γ-butyrolactone, and sulfur-based ester (ethylene glycol sulfite or the like). Among them, the ester is preferably a cyclic ester, and more preferably a cyclic carbonate, such as ethylene carbonate, vinylene carbonate, propylene carbonate or butylene carbonate. In addition to the above solvents, a polar chain carbonate with a low viscosity or an aliphatic branched carbonate compound, which is typified by dimethyl carbonate, diethyl carbonate, or methyl ethyl carbonate can be used. The more preferable nonaqueous solvent is a mixed solvent of the cyclic carbonate (especially, an ethylene carbonate) and a chain carbonate.

Further, in addition to the above nonaqueous solvent, the nonaqueous solvent in use can include chain alkyl esters such as methyl propionate; chain phosphate triesters such as trimethyl phosphate; solvent with nitrile group such as 3-methoxypropionitrile; and a nonaqueous solvent (organic solvent) of a branched compound having an ether bond typified by dendrimer and dendron.

Alternatively, a fluorinated solvent can also be used.

Examples of the fluorinated solvents include a straight-chain (perfluoroalkyl)alkyl ether such as $H(CF_2)_2OCH_3$, $C_4F_9OCH_3$, $H(CF_2)_2OCH_2CH_3$, $H(CF_2)_2OCH_2CF_3$, $H(CF_2)_2CH_2O(CF_2)_2H$, $CF_3CHFCF_2OCH_3$, $CF_3CHFCF_2OCH_2CH_3$ or the like. Examples of the fluorinated solvents further include iso(perfluoroalkyl)alkyl ether, that is, 2-trifluoromethyl hexafluoropropyl methyl ether, 2-trifluoromethyl hexafluoropropyl ethyl ether, 2-trifluoromethyl hexafluoropropyl propyl ether, 3-trifluoro octafluoro butyl methyl ether, 3-trifluoro octafluoro butyl ethyl ether, 3-trifluoroocta fluorobutyl propyl ether, 4-trifluoro decafluoro penthyl methyl ether, 4-trifluoro decafluoro penthyl ethyl ether, 4-trifluoro decafluoro penthyl propyl ether, 5-trifluoro dodecafluoro hexyl methyl ether, 5-trifluoro dodecafluoro hexyl ethyl ether, 5-trifluoro dodecafluoro hexyl propyl ether, 6-trifluoro tetra-decafluoro heptyl methyl ether, 6-trifluoro tetra-decafluoro heptyl ethyl ether, 6-trifluoro tetra-decafluoro heptyl propyl ether, 7-trifluoro hexadecafluoro octyl methyl ether, 7-trifluoro hexadecafluoro octyl ethyl ether, 7-trifluoro hexadecafluoro hexyl octyl ether and the like.

Further, the fluorinated solvent in use can be a mixture of the above iso(perfluoroalkyl)alkyl ether, and the straight-chain (perfluoroalkyl)alkyl ether.

Lithium salts, such as a lithium perchlorate, an organic lithium borate, a lithium salt being a fluorine compound, or a lithium imide salt is preferable as the electrolyte salt for use in the nonaqueous electrolyte solution.

Specifically, examples of such electrolyte salts include $LiClO_4$, $LiPF_6$, $LiBF_4$, $LiAsF_6$, $LiSbF_6$, $LiCF_3SO_3$, $LiCF_3CO_2$, $Li_2C_2F_4(SO_3)_2$, $LiN(CF_3SO_2)_2$, $LiN(C_2F_5SO_2)_2$, $LiC(CF_3SO_2)_3$, $LiC_nF_{2n+1}SO_3$ (n≥2), $LiN(R_fOSO_2)_2$ (where $R_f$ is a fluoroalkyl group), and the like. Among these lithium salts, the fluorine-containing organic lithium salt is more preferable. The fluorine-containing organic lithium salt tends to be easily dissolved in the nonaqueous electrolyte solution because the salt is very anionic and is easily separated into ions.

The concentration of the electrolyte salt in the nonaqueous electrolyte solution is, for example, preferably 0.3 mol/L (moles/liter) or more, and more preferably 0.7 mol/L or more, and is also preferably 1.7 mol/L or less, and more preferably 1.2 mol/L or less. When the concentration of the electrolyte salt is too low, the ion conductivity is decreased. In contrast, when the concentration of the electrolyte salt is too high, the electrolyte salt not dissolved may be precipitated.

Various kinds of additives that can be used to improve the battery performance may be added to the nonaqueous electrolyte solution. The additive is not limited to a specific one.

For example, some of the nonaqueous electrolyte solution to which a compound containing a carbon-carbon (C=C) unsaturated bond in a molecule is added can suppress the reduction in charging and discharging cycle characteristics of the battery using the compound.

Examples of such compounds containing the C=C unsaturated bond in a molecule include aromatic compounds such as $C_6H_5C_6H_{11}$ (cyclohexyl benzene); fluorinated aliphatic compounds such as $H(CF_2)_4CH_2OOCCH=CH_2$, and $F(CF_2)_8CH_2CH_2OOCCH=CH_2$; and fluorine-containing aromatic compounds. Sulfur-containing compounds (for example, chain or cyclic sulfonate, chain or cyclic sulfate, and the like), typified by 1,3-propanesultone, 1,2-propanediol sulfate, vinylene carbonate, vinyl ethylene carbonate, fluorinated ethylene carbonate, and the like can be used, which are often very effective. In particular, in case of using a highly crystalline carbon as a negative electrode active material, the combination use with vinylene carbonate, vinyl ethylene carbonate, fluorinated ethylene carbonate or the like is more effective. The amount of addition of these additives is preferably, for example, in a range of 0.05 to 5% by mass relative to the total amount of nonaqueous electrolyte solution.

The above vinylene carbonate, vinyl ethylene carbonate, or fluorinated ethylene carbonate forms a protective film on a surface of the negative electrode by charging the battery using the nonaqueous electrolyte solution containing such an additive, and thus suppresses the reaction caused by contact between a negative electrode active material and the nonaqueous electrolyte solution thereby to prevent the decomposition or the like of the nonaqueous electrolyte solution in such a reaction.

Further, an anhydride may be added to the nonaqueous electrolyte solution so as to improve the high temperature characteristics of the nonaqueous electrolyte secondary battery.

The anhydride gets involved in formation of a composite film on the surface of the negative electrode as a surface modifier of the negative electrode, and has a function of further improving the storage characteristics of the battery or the like at high temperature. Addition of the anhydride to the nonaqueous electrolyte solution can reduce the amount of water in the nonaqueous electrolyte solution, and thereby decrease the amount of gas generated in the battery using the nonaqueous electrolyte solution.

The anhydride added to the nonaqueous electrolyte solution is not limited to a specific one, and may be any compound containing at least one anhydride structure in a molecule. Further, the anhydride may be any compound having a plurality of anhydride structures.

Specifically, examples of the anhydrides include mellitic anhydride, malonic anhydride, maleic anhydride, butyric anhydride, propionic anhydride, pulvinic anhydride, phthalonic anhydride, phthalic anhydride, pyromellitic anhydride, lactic anhydride, naphthalic anhydride, toluic anhydride, thiobenzoic anhydride, diphenic anhydride, citraconic anhydride, diglycolamidic anhydride, acetic anhydride, succinic anhydride, cinnamic anhydride, glutaric anhydride, glutaconic anhydride, valeric anhydride, itaconic anhydride, isobutyric anhydride, isovaleric anhydride, and benzoic anhydride. These acid anhydrides may be used alone or in combination of two or more kinds. The amount of addition of the acid anhydride in the nonaqueous electrolyte solution is preferably in a range of 0.05 to 1% by mass relative to the total amount of the nonaqueous electrolyte solution.

The nonaqueous electrolyte secondary battery has only to include the above nonaqueous electrolyte solution, and the other components of the secondary battery are not limited to specific ones, and can be made of the same components as those of a nonaqueous electrolyte secondary battery well known in the art.

A positive electrode active material associated with the positive electrode in use can be made of a compound that can intercalate and deintercalate lithium ions. Examples of the positive electrode active materials include a lithium-containing composite oxide represented by $Li_xMO_2$ or $Li_yM_2O_4$ (where M is a transition metal, 0≤x≤1, 0≤y≤2), a spinel oxide, a layered metal chalcogen compound, an oxide having olivine structure and the like.

Specific examples of the positive electrode active material include metal oxides, including a lithium cobalt oxide such as $LiCoO_2$, a lithium manganese oxide such as $LiMn_2O_4$, a lithium nickel oxide such as $LiNiO_2$, a lithium titanium oxide such as $Li_{4/3}Ti_{5/3}O_4$, a lithium-manganese-nickel composite oxide, a lithium-manganese-nickel-cobalt composite oxide, a manganese dioxide, a vanadium pentoxide, a chrome oxide and the like; a material having an olivine type crystal structure such as $LiMPO_4$ (M=Fe, Mn, Ni); and metallic sulfide such as titanium disulfide and molybdenum disulfide.

In particular, the lithium-containing composite oxide having the layered structure or spinel structure is preferably used. The lithium-containing composite oxides include a lithium-manganese-nickel composite oxide typified by $LiCoO_2$, $LiMn_2O_4$, $LiNiO_2$, $LiNi_{1/2}Mn_{1/2}O_2$ or the like; a lithium-manganese-nickel-cobalt composite oxide typified by $LiNi_{1/3}Mn_{1/3}CO_{1/3}O_2$, $LiNi_{0.6}Mn_{0.2}CO_{0.2}O_2$ or the like; and a lithium-containing composite oxide like $LiNi_{1-x-y-z}CO_xAl_yMg_zO_2$ (0≥x≥1, 0≥y≥0.1, 0≥z≥0.1, 0≥1-x-y-z≥1), a part of which is substituted by an addition element selected from the group comprising Ge, Ti, Zr, Mg, Al, Mo, Sn, etc. In other words, using as the positive electrode active material the lithium-containing composite oxides exhibiting an open-circuit voltage of 4 V or more based on the Li reference in charging can take advantage of the features of the nonaqueous electrolyte solution according to the embodiments, and provide the nonaqueous electrolyte secondary battery with high safety.

Such a positive electrode active material may be used alone or in combination of two or more kinds. For example, the use of both the layered lithium-containing composite oxide and the spinel structured lithium-containing composite oxide can achieve both the increase in capacity and safety.

The positive electrode for constituting the nonaqueous electrolyte secondary battery is produced, for example, by appropriately adding a conductive material such as carbon black or acetylene black, or a binder such as polyvinylidene fluoride or polyethylene oxide to the above positive electrode active material to prepare a positive electrode mixture, and by applying the mixture to a collector material such as an aluminum foil to make a strip-shaped sheet. The manufacturing method of the positive electrode is not limited to only the above example.

A negative electrode active material of a negative electrode for constituting the organic electrolyte secondary battery of the embodiment can be made, for example, by using a compound that can insert and extract electrochemically lithium ions.

For example, in addition to the single lithium metal itself, various kinds of materials including alloys such as Al, Si, Sn and In, an oxide for enabling the charging and discharging of the battery at a low potential close to that of lithium (Li), and carbon material can also be used as the negative electrode active material.

In the nonaqueous electrolyte secondary battery of this embodiment, carbon material that can electrochemically discharge and store the lithium ions is more preferable as the negative electrode active material. Such carbon materials include, for example, graphite, pyrolytic carbons, cokes, glassy carbons, a heat-treated material of an organic polymer compound, a mesocarbon microbead, carbon fiber, activated carbon and the like.

In using the carbon material as the negative electrode active material, an interlayer distance d002 of (002) surface of the carbon material is preferably 0.37 nm or less. In order to achieve the high capacity of the battery, the distance d002 is more preferably 0.35 nm or less, and further more preferably 0.34 nm or less. The lower limit of the d002 is not limited to a specific one, but about 0.335 nm in theory.

The crystallite size Lc of the carbon material in the c-axis direction is preferably 3 nm or more, more preferably 8 nm or more, and particularly preferably 25 nm or more. The upper limit of the Lc is not limited to a specific one, but normally about 200 nm. The average particle diameter is preferably 3 μm or more, and more preferably 5 μm or more, and is preferably 15 or less, and more preferably 13 μm or less. The purity of the carbon material is desirably 99.9% or more.

The negative electrode is produced, for example, by appropriately using the above negative electrode active material, or by appropriately adding a conductive material (carbon black, acetylene black or the like), and/or a binder (polyvinylidene fluoride, styrene-butadiene rubber or the like) etc. to the above negative electrode active material if necessary to thereby prepare a negative electrode mixture, and by applying the negative electrode mixture to a conductive collector such as a copper foil to make a sheet. The manufacturing method of the negative electrode is not limited to the above example.

In the nonaqueous electrolyte secondary battery of the embodiment, a separator for partitioning an inside of the battery into the positive electrode and the negative electrode is not also limited. Various types of separators used in the nonaqueous electrolyte secondary batteries known in the art can be used.

For example, a microporous separator is suitable for use which is made of polyolefin resin such as polyethylene or polypropylene, or polyester resin such as polybutylene terephthalate. Further, these microporous separators (microporous films) can be used by being superimposed on each other.

The thickness of the separator is not limited to a specific one, but is preferably in a range of 5 to 30 μm taking into consideration the safety and increase in capacity of the battery. The air permeability of the separator is not limited to a specific level, but preferably in a range of 10 to 1000 (seconds/100 mL), more preferably in a range of 50 to 800 (seconds/100 mL), and most preferably in a range of 90 to 700 (seconds/100 mL).

In the nonaqueous electrolyte secondary battery of the embodiment, for example, A pair of the above-mentioned positive electrode and negative electrode is sandwiched via microporous polyethylene separator and wound up in spiral to form an electrode roll, which is attached to a metal can. The positive and negative electrodes are connected to positive and negative terminals of the can via a lead or the like. Further, the nonaqueous electrolyte solution of the embodiment is injected into the jacket, which is then sealed, whereby the nonaqueous electrolyte solution of this embodiment is produced.

A metallic rectangular or cylindrical can, or a laminate material constructed by uniting a metal layer (aluminum) and two or more other layers can be used as the package of the battery.

The manufacturing method of the nonaqueous electrolyte secondary battery and the structure of the battery are not limited. In case of using the carbon material having the d002 of 0.34 nm or less as the negative electrode active material, an open formation process for charging the battery is preferably performed after accommodating the positive electrode, the negative electrode, the separator and the nonaqueous electrolyte solution in the can, and before completely sealing the battery.

Thus, gas generated in the early stage of charging of the battery, or residual water in the battery can be removed outside the battery.

The removal method of the gas in the battery to be performed after the above open format ion process is not limited to a specific one, and either a natural removal or vacuum removal may be used. Before completely sealing the battery, the battery may be appropriately molded by a pressing operation or the like.

The nonaqueous electrolyte secondary battery of the embodiment has excellent safety and good battery characteristics, and thus can be widely used because of this feature, not only as a secondary battery for a power source of a mobile information equipment such as a cellular phone or a notebook, but also as a power source for various devices such as an electric vehicle or a hybrid electric car.

EXAMPLES

Now, the present invention will be described with examples in more detail below. The present invention is not limited to the following examples, and can be modified without departing from the scope of the present invention. In the description below, the term "% (percent)" is based on the mass unless otherwise specified.

The molecular weight determination method of a synthesized substance and the identification method of the synthesized compound will be described below.

(1) Molecular Weight Determination

The molecular weight and the distribution of the molecular weight of the synthesized substance were measured by gel permeation chromatography (GPC) using polystyrene as a reference on the following conditions.

[Measurement Conditions]

Measuring Device: liquid chromatography "L-6000" (manufactured by Hitachi High-Technologies Corporation)

Detector: Differential Refractive Index (RI) Detector "L-3300" (manufactured by Hitachi High-Technologies Corporation)

Column: Gelpack GL-R440+R450+R400M
Specimen Concentration: 120 mg/5 mL
Column Temperature: 25° C.
Mobile Phase: tetrahydrofuran (THF)
Flow Rate: 2.05 mL/minute
Injection Amount of Specimen: 200 microliter (2) Identification of Synthesized Compound The $^1$H-NMR and $^{13}$C-NMR spectra of the compound were measured by using the following NMR (nuclear magnetic resonance), so that the synthesized compound was identified, and the composition of a copolymer was analyzed.

Identification Device: BRUKER AV400M
$^1$H, 400.13 MHz
Solvent: heavy chloroform (CDCl$_3$)

Example 1

Synthesis of Copolymer Having Biphenyl Functional Group

A copolymer (represented by the following chemical formula (14)) having a biphenyl functional group represented by the above chemical formula (8) where x1 corresponds to 2 (in which x1 is the average number of addition of oxyethylene units) was synthesized. The copolymer is referred to as a "polymer (i)".

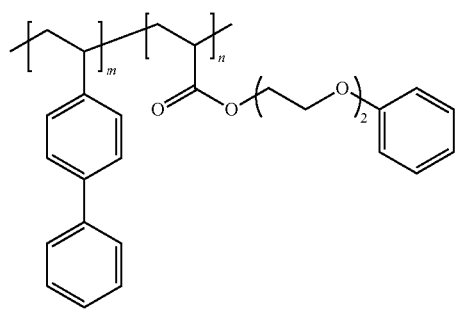

(14)

First, diethylene glycol monophenyl ether acrylate (4.25 g) which was an ethoxy phenyl acrylate (EO=2 moles), and 4-vinyl biphenyl (0.75 g) were mixed in a two-necked eggplant-shaped flask of 50 mL (milliliters) equipped with a thermometer, a reflux condenser and a stirrer. Then, 50 mg of azobisisobutyronitrile (AIBN) was added as the polymerization initiator to the mixture.

Further, 20 g of dimethyl carbonate (DMC) was put into the mixture, and then argon gas was used to remove oxygen in the system. Thereafter, the mixture underwent a reaction in an oil bath at 60° C. for three hours, while being subjected to bubbling with argon gas, and were further subjected to the reaction at 70° C. for two hours.

After the reaction was finished, 30 mL of cool methanol was gradually added to the reacted mixture, and stirred to be precipitated. Thereafter, a precipitate was washed with the cool methanol several times to thereby remove unreacted monomers and additives, which provided a solid polymer.

The washed polymer was dried under a reduced pressure at 60° C. to remove the methanol, and further dried under vacuum for one night at 80° C. to thereby obtain about 3.3 g of transparent faint yellow solid polymer (i) having viscous elasticity. The yield was 66%.

The structure of the polymer (i) was confirmed by $^1$H-NMR (see FIG. 1) and $^{13}$C-NMR. The ratio of diethylene glycol monophenyl ether acrylate to 4-vinyl biphenyl in the molecule of the polymer (i) was determined to be a value substantially according to the amount of preparation by calculation of the area ratio of respective proton peaks in $^1$H-NMR spectrum. The molecular weight of the polymer was measured by the GPC thereby to obtain the number average molecular weight of 21000.

<Preparation of Nonaqueous Electrolyte Solution>

LiPF$_6$ was dissolved at a concentration of 1.0 mol/L in a mixed solvent containing ethylene carbonate (EC), methyl ethyl carbonate (MEC), and diethyl carbonate (DEC) in a volume ratio of 1:1:1. The polymer (i) was added to the mixture so as to be contained in a certain amount to thereby prepare a nonaqueous electrolyte solution. The preparation of the nonaqueous electrolyte solution was performed under Ar atmosphere.

The composition of the electrolyte solution of the polymer (i) is hereinafter referred to as "electrolyte solution (i)".

<Manufacture of Positive Electrode>

Three parts by mass of a carbon black as the conductive agent was added and mixed into 93 parts bymass of lithium cobaltate LCO (positive electrode active material). Then, a solution containing 4 parts by mass of polyvinyl fluoride (PVDF) dissolved in N-methyl-2-pyrolidon (NMP) was added and mixed into the mixture to thereby prepare slurry containing a positive electrode mixture.

After the slurry was passed through a 70 mesh filter to remove particles with large grain size, the slurry was uniformly applied and dried onto one side of a positive electrode collector formed of an aluminum foil of 20 µm in thickness to form an electrode. The electrode was pressed and cut into a circular part having a diameter φ=1.5 cm to manufacture a positive electrode thereby.

The amount of the positive electrode mixture was 100 g/m$^2$, and the electrode density of the positive electrode was 3.0 g/cm$^3$.

<Manufacture of Negative Electrode>

A circular lithium metal piece having a diameter φ=1.8 cm was used as the negative electrode.

<Assembly of Battery>

A circular separator made of polyolefin and having a thickness of 25 µm and a diameter of 2.5 cm was sandwiched between the positive and negative electrodes with the lead attached thereto to thereby form an electrode group.

Then, 200 µL of the electrolyte solution was injected into the electrode group, which was thereafter sealed with an aluminum laminate to thereby produce a battery. All operations were performed in an argon box.

<Evaluation of Battery>

1. Initialization of Battery

The thus-obtained battery was left at room temperature for 12 hours, and charged at 0.8 mA corresponding to 0.3 CmA (current density=0.45 mA/cm$^2$) until 4.3 V, and thereafter further discharged until 3 V.

This charge-discharge cycle was repeated twice to thereby initialize the battery. The discharge capacity of the battery in the second cycle was defined as a battery capacity of the battery. In discharging the battery in the second cycle, a direct current resistance R was determined from a voltage drop ΔE in five seconds after starting of the discharge, and a current value I in the discharging.

2. Overcharge Test

The obtained battery was previously charged at a current value of current density of 0.45 mA/cm² until 4.3 V.

Thereafter, the battery was subjected to the overcharge test at a current value of 2.4 mA (current density=1.36 mA/cm²) corresponding to 1 CmA at a voltage up to 7 V at room temperature or 60° C. The overcharge characteristics were evaluated by using the ratio (%) of the total charge capacity containing a charge capacity to 4.3V and overcharging caoapcity to the theoretical capacity of the positive electrode of the battery (electrical capacity in state that all Li⁺ ions were extracted out of the positive electrode material). When the voltage does not reach the upper limit of 7V, the overcharge test was performed with the theoretical capacity of the positive electrode of the battery set as the upper limit.

The charge capacity corresponding to a reaction start voltage of the overcharge inhibitor of the Examples was determined from a reaction peak of the overcharge inhibitor based on a curve (dQ/dV-Q curve) of the relationship between a change in charge capacity (dQ/dV) at a constant voltage and the charge capacity. Further, the above battery was charged up to 4.3 V after the initialization, and then was charged at a constant current corresponding to 1 CmA until 5 V, and thereafter ended. The battery was left at room temperature for three hours, and then a circuit voltage OCV of the battery was also measured, and the degree of overcharge with respect to the positive electrode was evaluated thereby.

Figure 2:
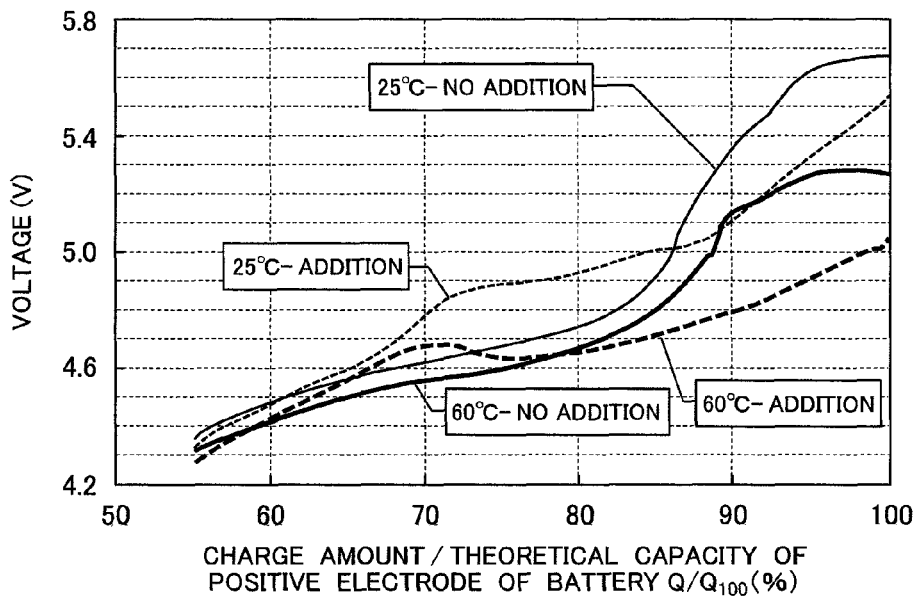
FIG. 2 is a graph showing an overcharge curve in case of using the polymer for the nonaqueous electrolyte secondary battery of the embodiment.
Figure 3:
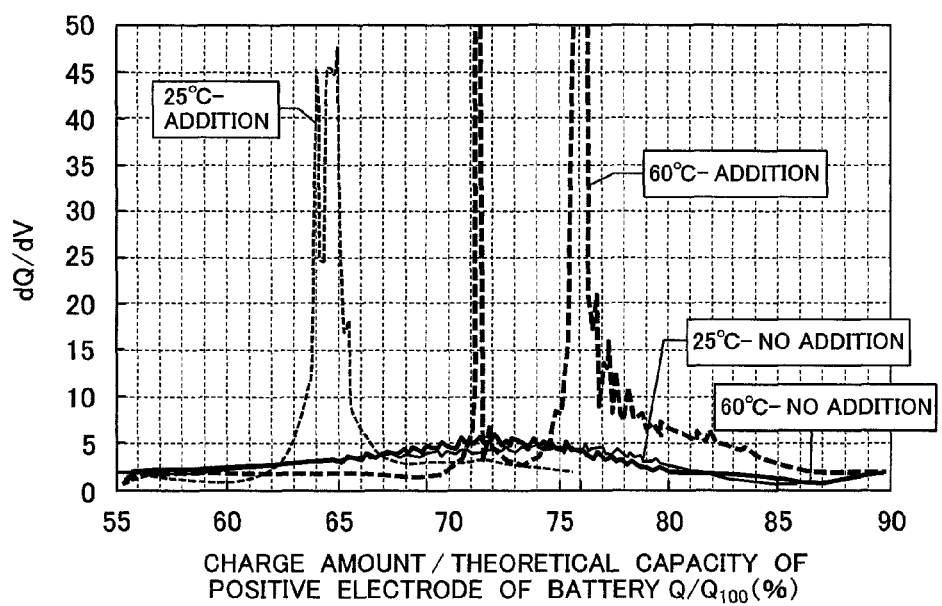
FIG. 3 is a graph showing a dQ/dV-Q curve during the charging in case of using the polymer for the nonaqueous electrolyte secondary battery of the embodiment.

FIG. 2 shows an overcharge curve of the above electrolyte solution with 4% by weight of polymer (i) added thereto. FIG. 3 shows the dQ/dV-Q curve of the above electrolyte solution with 4% by weight of polymer (i) added thereto. In FIG. 3, the lateral axis indicates the ratio of the charge capacity in the overcharge corresponding to the charging capacity Q to the theoretical capacity of the positive electrode of the battery.

Table 1 shows the findings determined from FIGS. 2 and 3.

about 71% (see FIG. 2). The charge voltage at the voltage peak was 4.68 V.

The battery with polymer (i) added had a high charge voltage at the time of the potential responsibility as compared to the battery to without polymer (i) added at the same charging ratio. This seems to be because the polymer (i) was polymerized to form a film on the surface of the overcharged LiCoO₂, which resulted in an increase in resistance of the battery.

2) The potential responsibility at the LiCoO₂ electrode depends on the temperature.

The charge voltage at which the potential responsibility of the polymer (i) was exhibited was decreased with increasing temperature (see FIG. 2). By comparing the overcharge behavior between 25° C. (room temperature) and 60° C., the charge potential at the time of response to the potential was 4.86 V at the room temperature, and 4.68 V at 60° C.

The charge amount in the overcharge up to 5V is clearly large at 60° C. This is because more biphenyl groups reacted at 60° C. as compared to that at the room temperature, and at the time of the overcharge, the biphenyl groups included in the positive electrode at a high potential were electropolymerized to consume the charging current. Thus, the overcharge of the battery can be suppressed.

3) The addition of the polymer (i) suppresses the overcharge of the positive electrode material.

At the room temperature, by comparison between the battery system with the polymer (i) added and the battery system without addition of the polymer (i), both battery systems had the same level of about 85% of the theoretical capacity of the battery during overcharging them up to 5V. After being left at the room temperature for three hours, the battery system without the addition of the polymer (i) had an OCV of 4.590 V higher by about 0.08 V than an OCV of 4.511 V of the battery system with the polymer (i) added. This means that the addition of the polymer (i) reduces the overcharge of the LiCoO₂ positive electrode by about 8% at the room temperature.

TABLE 1

Overcharge Characteristics of LiCoO₂/Li Cell containing Polymer (i)

| Battery system | Potential responsibility | | Total charge amount* in overcharge up to 5 V | OCV (V) (after overcharge) |
| --- | --- | --- | --- | --- |
| | Potential (V) | Charge amount* (%) | | |
| No addition of polymer (i) at room temperature | — | — | 85.7 | 4.590 |
| Addition of polymer (i) at room temperature | 4.85 | 73.4 | 85.1 | 4.511 |
| No addition of polymer (i) at 60° C. | — | — | 89.8 | 4.579 |
| Addition of polymer (i) at 60° C. | 4.68 | 71.3 | 97.4 | 4.455 |

*The charge amount (%) means the ratio of all charge capacity including the charge capacity in overcharge to the theoretical capacity of the positive electrode material.

As can be clearly seen from the above results of the overcharge test, the polymer (i) has the following properties.

1) The polymer (i) is electropolymerized at a LiCoO₂ electrode in the overcharge state, and has the adequate potential responsibility.

The battery using the polymer (i) and overcharged at 60° C. had a voltage peak on a voltage curve indicative of the potential responsibility when the ratio of all charge capacity to the theoretical capacity of the positive electrode material reached Further, at a temperature of 60° C., the total charge amount of the battery system with the polymer (i) added in overcharging up to 5V was large, but the battery system with the polymer (i) added has an OCV of 4.455 V after overcharging, which was low as compared to an OCV of 4.579 V of the battery system without the addition of the polymer (i).

As can be seen from the results, the addition of the polymer (i) can suppress the overcharge of the positive electrode material.

The above results can have confirmed that the synthesized polymer (i) exhibits the same overcharge behavior as that of the low-molecule overcharge inhibitor, and that the polymer (i) can serve as the overcharge inhibitor in principle.

3. Measurement of Cyclic Voltammetry (CV)

A battery (cell) was produced by using a platinum electrode with a diameter φ=5 mm as a working electrode, a lithium metal as a counter electrode, and an electrolyte solution containing 2% by weight of polymer (i) as an electrolyte. The reaction at the platinum electrode of the polymer (i) was evaluated by using the battery by the CV measurement. The measurement rate was 5 mV/cm$^2$, and the measurement potential was changed starting from 3 V in a potential measurement range of 3 to 5.5 V.

As the measurement device, a frequency response analyzer SI1255B TYPE (trade name) and a potentiostat/galvanostat 1287 TYPE (trade name), manufactured by Solartron in United Kingdom were combined to be used.

Figure 4:
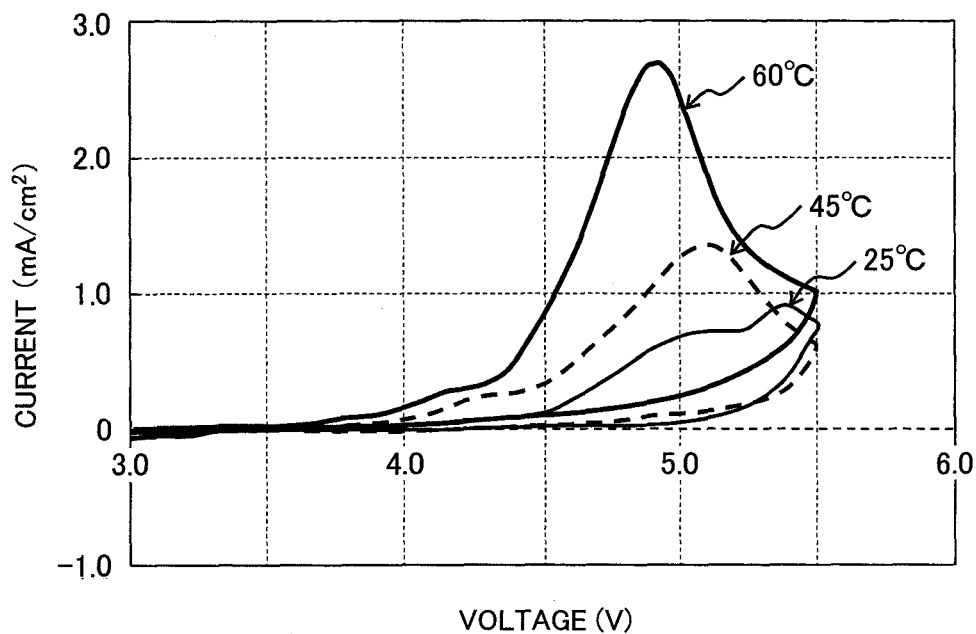
FIG. 4 is a graph showing a CV curve on a platinum electrode in case of using the polymer for the nonaqueous electrolyte secondary battery of the embodiment.

A current-potential curve was shown in FIG. 4.

It has been found from FIG. 4 that the charge voltage at which the potential responsibility of the polymer (i) appeared was also decreased with increasing temperature in the platinum electrode, and that the potential responsibility depended on the temperature.

4. Observation with Scanning Electron Microscope (SEM)

A dark film formed on a surface of the platinum electrode after the above CV measurement was observed with a SEM.

After the cell was scraped, the platinum electrode was taken out, washed with DMC several times, and then immersed in the DMC for one night. Thereafter, the electrode was dried under vacuum at the room temperature for three hours, and subjected to a Pt sputtering coating. Then, the surface of the electrode was observed for measurement by a scanning electron microscope (trade name: S-4800, manufactured by Hitachi High-Technologies Corporation) (see FIGS. 5 and 6). The acceleration voltage in observation with the SEM was 5 kV.

Figure 5:
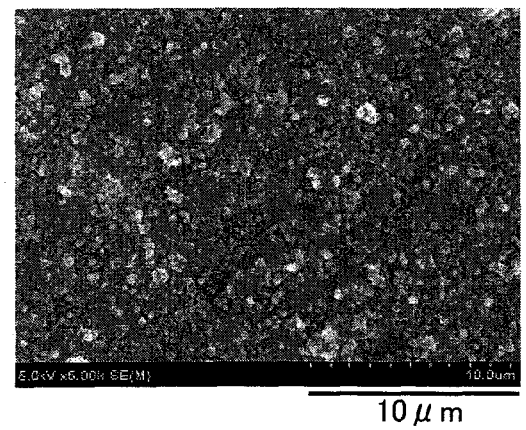
FIG. 5 is an SEM photograph of a film formed of a polymer for a nonaqueous electrolyte secondary battery at a platinum electrode after electrolytic polymerization in an embodiment.
Figure 6:
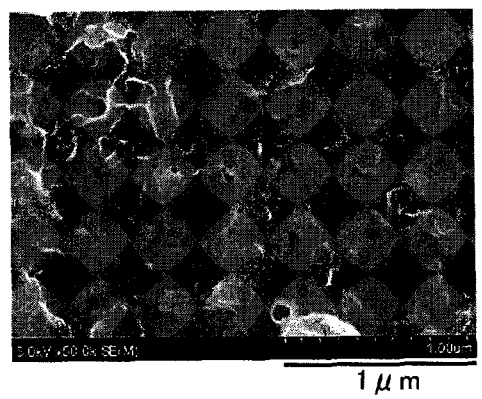
FIG. 6 is an SEM photograph of the film formed of the polymer for the nonaqueous electrolyte secondary battery at the platinum electrode after the electrolytic polymerization in the embodiment.

As can be seen from FIGS. 5 and 6, a brown film made of polymer (i) not dissolved even by washing with the electrolyte was formed on the surface of the platinum electrode after the CV measurement. The film had its surface made of porous material, and was formed of aggregation and bond between particles of the polymer (i). The particles of the polymer (i) were small-sized, and became smooth. This seems to be because the polymers (i) were polymerized by a cross-linking reaction between the biphenyl groups in the molecules, whereby the solubility of the polymer (i) into the electrolyte solution was rapidly reduced, causing the polymer (i) to be precipitated on the surface of the electrode.

Comparative Example 1

A nonaqueous electrolyte solution was prepared in the same way as Example 1 except that the polymer (i) was not added. A battery was manufactured and evaluated in the same way as Example 1 except for the use of this nonaqueous electrolyte solution.

The results of the overcharge are shown in FIGS. 3 and 4.

Comparative Example 2

A nonaqueous electrolyte solution containing 1% by weight of biphenyl was prepared in the same way as Example 1 except that the polymer (i) was not added. A battery was manufactured and evaluated in the same way as Example 1 except for this use of the nonaqueous electrolyte solution.

From FIG. 1 it has been found that the polymer (i) is a copolymer having a biphenyl functional group.

As can be seen from FIGS. 2 to 4, the use of the nonaqueous electrolyte solution containing the polymer (i) in the LCO nonaqueous electrolyte secondary battery exhibits the maximum potential responsibility of 4.85 V at the room temperature, and of 4.68 V at 60° C., and forms the film on the surface of the positive electrode.

Table 2 shows monomer compositions prepared for manufacturing polymers of the Examples.

Table 3 shows the overcharge characteristics of batteries using the polymers of the Examples.

As can be seen from Table 3, the Examples suppress the charging of the positive electrode in overcharging of the battery, and simultaneously increase the internal resistance of the battery.

TABLE 2

Monomer Compositions Prepared for Manufacturing Polymers of Examples

| Polymer | | Monomer composition prepared | | | | Number average |
|---|---|---|---|---|---|---|
| No. | Structural formula | X | Y | X/Y (wt %) | Yield (%) | molecular weight Mn |
| (i) | Chemical formula 14 | 4-viny biphenyl | ethoxyphenyl acrylate (EO = 2 moles) | 20/80 | 66 | 21000 |
| (ii) | Chemical formula 15 | 4-viny biphenyl | ethoxyphenyl acrylate (EO = 2 moles) | 30/70 | 63 | 18000 |
| (iii) | Chemical formula 16 | 4-vinylcyclohexyl benzene | ethoxyphenyl acrylate (EO = 2 moles) | 20/80 | 61 | 23000 |
| (iv) | Chemical formula 17 | 4-viny biphenyl | vinyl acetate | 20/80 | 72 | 23000 |
| (v) | Chemical formula 18 | 4-vinylcyclohexyl benzene | vinyl acetate | 20/80 | 68 | 22000 |
| (vi) | Chemical formula 19 | 4-biphenyl acrylate | vinyl acetate | 20/80 | 89 | 25000 |

TABLE 2-continued

Monomer Compositions Prepared for Manufacturing Polymers of Examples

| Polymer | | Monomer composition prepared | | | | Number average |
|---|---|---|---|---|---|---|
| No. | Structural formula | X | Y | X/Y (wt %) | Yield (%) | molecular weight Mn |
| (vii) | Chemical formula 20 | 4-cyclohexyl benzyl acrylate | diethylene glycol monomethyl ether methacrylate | 20/80 | 92 | 28000 |
| (viii) | Chemical formula 21 | 4-phenyl vinyl benzoate | vinyl acetate | 20/80 | 86 | 25000 |
| (ix) | Chemical formula 22 | 4-phenyl allyl benzoate | vinyl acetate | 20/80 | 86 | 25000 |
| (x) | Chemical formula 23 | 4-cyclohexyl vinyl benzoate | vinyl acetate | 20/80 | 86 | 26000 |

TABLE 3

Overcharge Characteristics

| | Electrolyte | Battery capacity (mAh) | Direct-current resistance (Ω) (in full charge) | Potential responsibility at 60° C. | | OCV (V) (After overcharge up to 5 V) | Direct-current resistance (Ω) (after overcharge) |
|---|---|---|---|---|---|---|---|
| | | | | Potential (V) | Charge amount* (%) | | |
| Example 1 | Polymer (i) | 2.43 | 9 | 4.68 | 71.3 | 4.455 | 29 |
| Example 2 | Polymer (ii) | 2.42 | 9 | 4.65 | 70.9 | 4.453 | 56 |
| Example 3 | Polymer (iii) | 2.43 | 9 | 4.73 | 72.1 | 4.461 | 43 |
| Example 4 | Polymer (iv) | 2.42 | 9 | 4.65 | 71.0 | 4.455 | 36 |
| Example 5 | Polymer (v) | 2.43 | 9 | 4.69 | 71.7 | 4.462 | 38 |
| Example 6 | Polymer (vi) | 2.42 | 9 | 4.67 | 71.3 | 4.451 | 35 |
| Example 7 | Polymer (vii) | 2.43 | 9 | 4.73 | 71.9 | 4.463 | 29 |
| Example 8 | Polymer (viii) | 2.42 | 9 | 4.66 | 71.2 | 4.455 | 31 |
| Example 9 | Polymer (ix) | 2.41 | 9 | 4.66 | 71.1 | 4.453 | 41 |
| Example 10 | Polymer (x) | 2.43 | 9 | 4.72 | 71.8 | 4.462 | 38 |
| Comparative Example 1 | No addition | 2.43 | 9 | — | — | 4.579 | 8 |
| Comparative Example 2 | Biphenyl | 2.41 | 10 | 4.58 | 67.2 | 4.449 | 11 |

*The charge amount (%) means the ratio of all charge capacity including the charge capacity in overcharge to the theoretical capacity of the positive electrode.

Example 2

The polymer (ii) represented by the following chemical formula (15) was synthesized by using the same kind of monomer as that of the polymer (i) represented by the above chemical formula (14). The polymer (ii) was synthesized in the same way as that of the polymer (i) of Example 1 except for the use of the ratio shown in Table 2.

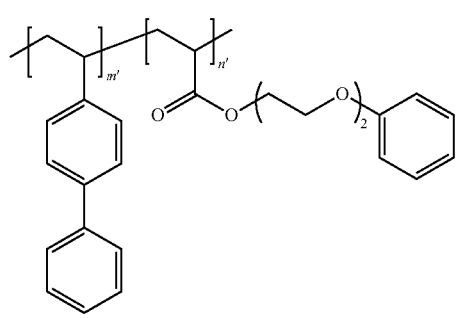

(15)

A nonaqueous electrolyte solution containing 4% by weight of polymer (ii) was prepared in the same way as Example 1 except that the polymer (ii) was used instead of the polymer (i). A battery for evaluation was manufactured and evaluated in the same way as Example 1 except for the use of this nonaqueous electrolyte solution.

The results are shown in Table 3.

Example 3

The polymer (iii) represented by the following chemical formula (16) and having a cyclohexyl benzene structure was synthesized. The synthesis of the polymer (iii) was performed in the same way as the synthesis of the polymer (i) of Example 1 except that 4-vinyl cyclohexyl benzene and diethylene glycol monomethyl ether methacrylate were used as a starting material.

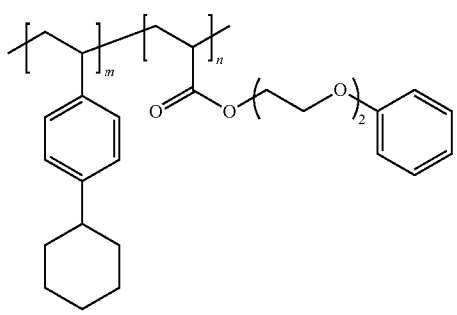

(16)

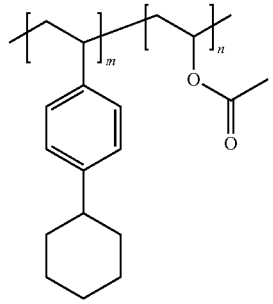

(18)

A nonaqueous electrolyte solution containing 4% by weight of polymer (iii) was prepared in the same way as Example 1 except that the polymer (iii) was used instead of the polymer (i). A battery for evaluation was manufactured and evaluated in the same way as Example 1 except for the use of this nonaqueous electrolyte solution.

The results are shown in Table 3.

Example 4

The polymer (iv) represented by the following chemical formula (17) and having a biphenyl structure was synthesized. The synthesis of the polymer (iv) was performed in the same way as the synthesis of the polymer (i) of Example 1 except that 4-vinyl biphenyl and vinyl acetate were used as a starting material.

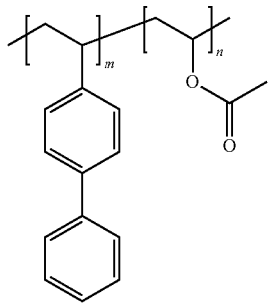

(17)

A nonaqueous electrolyte solution containing 4% by weight of polymer (iv) was prepared in the same way as Example 1 except that the polymer (iv) was used instead of the polymer (i). A battery for evaluation was manufactured and evaluated in the same way as Example 1 except for the use of this nonaqueous electrolyte solution.

The results are shown in Table 3.

Example 5

The polymer (v) represented by the following chemical formula (18) and having a cyclohexyl benzene structure was synthesized. The synthesis of the polymer (v) was performed in the same way as the synthesis of the polymer (i) of Example 1 except that 4-vinyl cyclohexyl benzene and vinyl acetate were used as a starting material.

A nonaqueous electrolyte solution containing 4% by weight of polymer (v) was prepared in the same way as Example 1 except that the polymer (v) was used instead of the polymer (i). A battery for evaluation was manufactured and evaluated in the same way as Example 1 except for the use of this nonaqueous electrolyte solution.

The results are shown in Table 3.

Example 6

The polymer (vi) represented by the following chemical formula (19) and having a biphenyl structure was synthesized. The synthesis of the polymer (vi) was performed in the same way as the synthesis of the polymer (i) of Example 1 except that 4-biphenyl acrylate and vinyl acetate were used as a starting material.

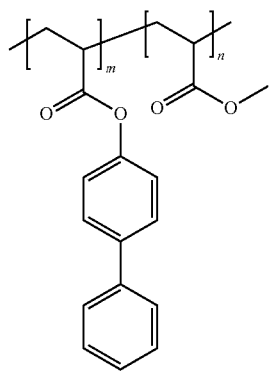

(19)

A nonaqueous electrolyte solution containing 4% by weight of polymer (vi) was prepared in the same way as Example 1 except that the polymer (vi) was used instead of the polymer (i). A battery for evaluation was manufactured and evaluated in the same way as Example 1 except for the use of this nonaqueous electrolyte solution.

The results are shown in Table 3.

Example 7

The polymer (vii) represented by the following chemical formula (20) and having a cyclohexyl benzyl structure was synthesized. The synthesis of the polymer (vii) was performed in the same way as the synthesis of the polymer (i) of Example 1 except for the use of 4-cyclohexyl benzyl acrylate and diethylene glycol monomethyl ether methacrylate as a starting material.

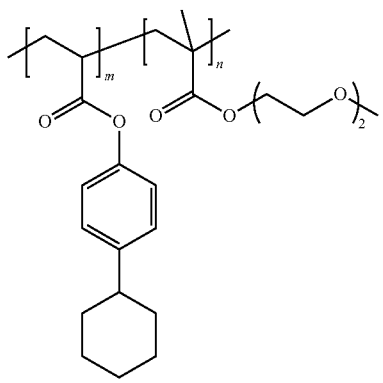

(20)

A nonaqueous electrolyte solution containing 4% by weight of polymer (vii) was prepared in the same way as Example 1 except that the polymer (vii) was used instead of the polymer (i). A battery for evaluation was manufactured and evaluated in the same way as Example 1 except for the use of this nonaqueous electrolyte solution.

The results are shown in Table 3.

Example 8

The polymer (viii) represented by the following chemical formula (21) and having a biphenyl structure was synthesized. The synthesis of the polymer (viii) was performed in the same way as the synthesis of the polymer (i) of Example 1 except that 4-phenyl vinyl benzoate and vinyl acetate were used as the starting material.

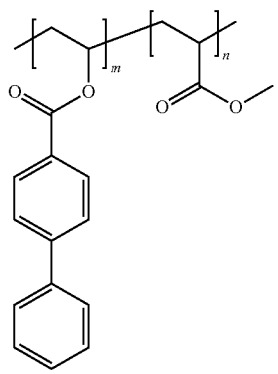

(21)

A nonaqueous electrolyte solution containing 4% by weight of polymer (viii) was prepared in the same way as Example 1 except that the polymer (viii) was used instead of the polymer (i). A battery for evaluation was manufactured and evaluated in the same way as Example 1 except for the use of this nonaqueous electrolyte solution.

The results are shown in Table 3.

Example 9

The polymer (ix) represented by the following chemical formula (22) and having a biphenyl structure was synthesized. The synthesis of the polymer (ix) was performed in the same way as the synthesis of the polymer (i) of Example 1 except that 4-phenyl allyl benzoate and vinyl acetate were used as the starting material.

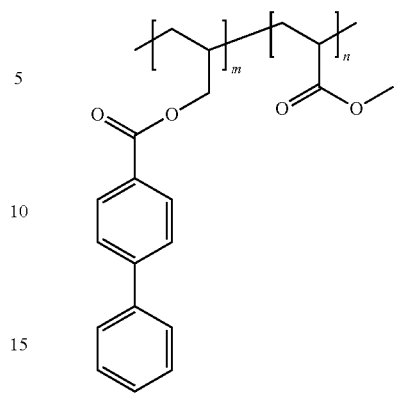

(22)

A nonaqueous electrolyte solution containing 4% by weight of polymer (ix) was prepared in the same way as Example 1 except that the polymer (ix) was used instead of the polymer (i). A battery for evaluation was manufactured and evaluated in the same way as Example 1 except for the use of this nonaqueous electrolyte solution.

The results are shown in Table 3.

Example 10

The polymer (x) represented by the following chemical formula (23) and having a cyclohexyl benzyl structure was synthesized. The synthesis of the polymer (x) was performed in the same way as the synthesis of the polymer (i) of Example 1 except that 4-cyclohexyl vinyl benzoate and vinyl acetate were used as the starting material.

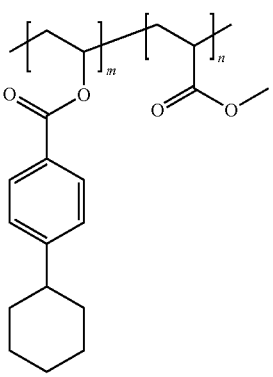

(23)

A nonaqueous electrolyte solution containing 4% by weight of polymer (x) was prepared in the same way as Example 1 except that the polymer (x) was used instead of the polymer (i). A battery for evaluation was manufactured and evaluated in the same way as Example 1 except for the use of this nonaqueous electrolyte solution.

The results are shown in Table 3.

As can be seen from Table 3, in the nonaqueous electrolyte secondary batteries of Examples 2 to 12, the polymer dissolved in the electrolyte solution is electropolymerized at a potential in a range of 4.4 to 4.8 V in overcharging at 60° C., and thus suppresses the charge of the positive electrode as compared to Comparative Example 1. Thus, even the use of the polymers (ii) to (x) can have the same effects as the use of the polymer (i).

It has been found that the battery containing the above polymer can largely increase the resistance of the battery after the overcharge as compared to the battery containing biphenyl which is a low-molecular weight additive for overcharge.

The structures of the secondary batteries of the embodiments will be described below with reference to the accompanying drawings.

Figure 7:
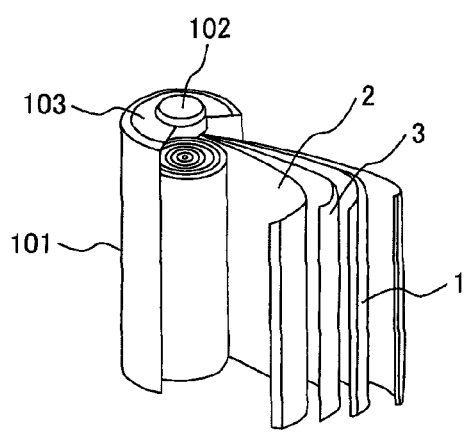
FIG. 7 is an exploded perspective view showing a secondary battery of an embodiment.

FIG. 7 is an exploded perspective view showing the secondary battery (a cylindrical lithium ion battery) of the embodiment.

The secondary battery shown in FIG. 7 includes a positive electrode 1 and a negative electrode 2 with a separator 3 sandwiched there between, which are wound to be sealed together with the nonaqueous electrolyte solution in a battery can 101. A positive electrode terminal 102 is provided to be electrically connected to the positive electrode 1 at the center of a battery cover 103. The battery can 101 is electrically connected to the negative electrode 2.

Figure 8:
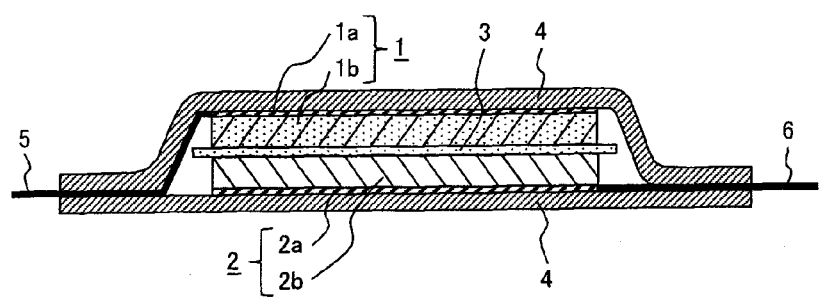
FIG. 8 is a cross-sectional view showing a secondary battery of another embodiment.

FIG. 8 is a cross-sectional view showing the secondary battery (a laminated cell) of another embodiment.

The secondary battery shown in the figure includes a positive electrode 1 and a negative electrode 2 with a separator 3 sandwiched therebetween, which are laminated and sealed together with the nonaqueous electrolyte solution in a battery package 4. The positive electrode 1 includes a positive electrode collector 1a and a positive electrode mixture layer 1b. The negative electrode 2 includes a negative electrode collector 2a and a negative electrode mixture layer 2b. The positive electrode collector 1a is connected to a positive electrode terminal 5, and the negative electrode collector 2a is connected to a negative electrode terminal 6.

Figure 9:
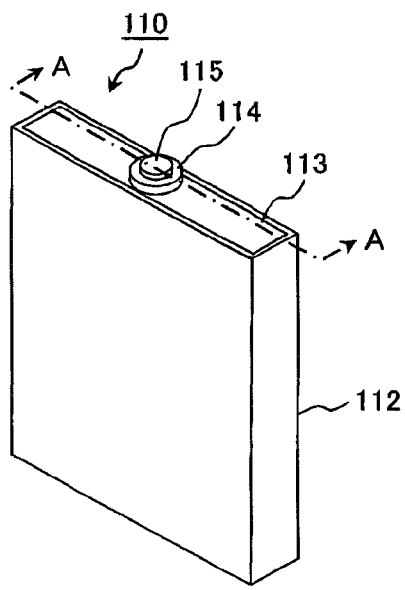
FIG. 9 is a perspective view showing a secondary battery of another embodiment.

FIG. 9 is a perspective view showing the secondary battery (a rectangular battery) of a further embodiment.

In FIG. 9, a battery 110 (nonaqueous electrolyte secondary battery) includes a flat electrode roll sealed in a rectangular outer can 112 together with the nonaqueous electrolyte solution. A terminal 115 is provided at a center of a cap plate 113 via an insulator 114.

Figure 10:
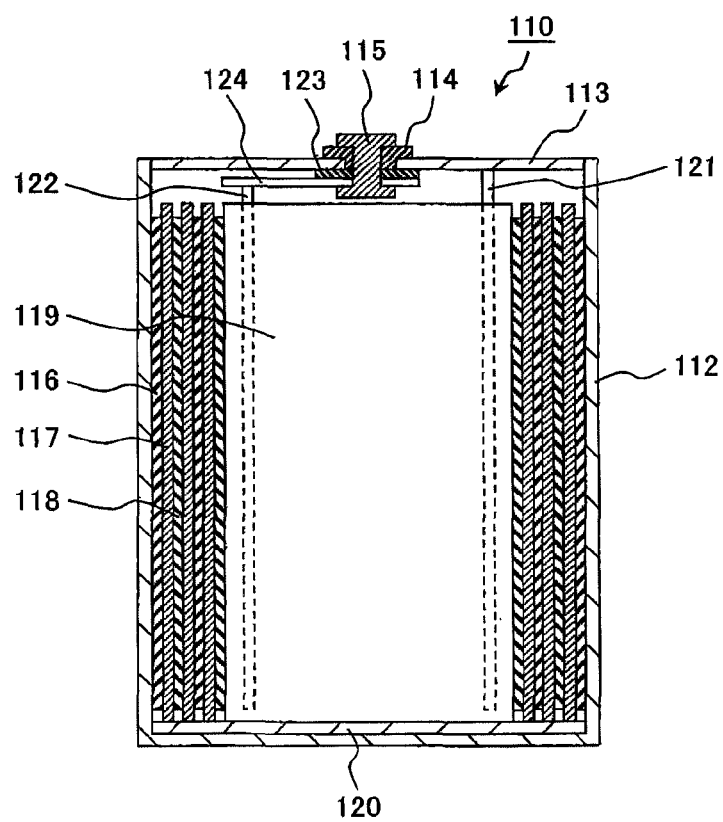
FIG. 10 is an A-A' cross-sectional view of FIG. 9.

FIG. 10 is a cross-sectional view taken along the line A-A of FIG. 9.

In FIG. 10, a positive electrode 116 and a negative electrode 118 are wound with a separator 117 sandwiched therebetween to form a flat electrode roll 119. An insulator 120 is provided at a bottom of the outer can 112 for preventing the short circuit between the positive electrode 116 and the negative electrode 118.

The positive electrode 116 is coupled to the cap plate 113 via a positive electrode lead 121. In contrast, the negative electrode 118 is coupled to a terminal 115 via a negative electrode lead 122 and a lead plate 124. An insulator 123 is sandwiched between the lead plate 124 and the cap plate 113 so as not to bring the lead plate 124 into direct contact with the cap plate 113.

The above structures of the secondary batteries according to the embodiments are illustrative. The secondary battery of the present invention is not limited to the above-mentioned structures, and covers all types of batteries to which the above overcharge inhibitors are applied.

According to the present invention, when being overcharged, the battery has increased internal resistance to increase the overcharge voltage, and thus can control a charge voltage by appropriately detecting a charging state. As a result, the present invention can provide a lithium ion battery having an overcharge inhibiting function with excellent safety.

The overcharge inhibitor is dissolved in the electrolyte solution, and works at a potential of 4.3 to 5.5 V based on the lithium metal. Thus, the overcharge inhibitor has the high electrochemical stability in the battery, and can be used without impairing the battery performance.

Further, in the overcharge inhibitor of the present invention, the functional groups for causing electrolytic polymerization such as a biphenyl group, a cyclohexyl benzyl group and the like are densely packed in one polymer. Thus, the overcharge inhibitor in the present invention has a high polymerization velocity as compared to the monomer, and hence has quickly increased the internal resistance.

A low-molecular weight compound such as cyclohexyl benzene generally has an effect of suppressing the overcharge by the electrolytic polymerization. When all compounds are electropolymerized to be diminished, however, the overcharge reaction of the battery is started again. At this time, since the products obtained from the electrolytic polymerization do not have an effect of increasing the internal resistance of the battery, the overcharge cannot be suppressed any more.

As to this point, in the overcharge inhibitor according to the present invention, the product obtained from the electrolytic polymerization has the effect of increasing the internal resistance of the battery. Thus, the overcharge inhibitor of the present invention is more excellent than the low-molecule weight compound such as cyclohexyl benzene.

In contrast, a polymer of thiophene has a low electrochemical stability, and tends to be decomposed in the battery to thereby reduce the battery performance. In particular, the thiophene polymer is also electropolymerized even at a potential of 4.0 V or less based on the lithium metal reference. This makes it difficult to apply the thiophene polymer to the present lithium ion battery (containing $LiCoO_2$ or the like in use) whose operating voltage is 4.0 V or more.

As to this point, the overcharge inhibitor of the present invention does not react in an operating voltage range of the battery, and is electropolymerized at the time of the overcharge, while increasing the internal resistance of the battery, thereby shutting down the battery reaction. The overcharge inhibitor of the present invention is superior to the thiophene polymer.

The overcharge inhibitor of the present invention increases the internal resistance of the battery in overcharging the battery to increase the overcharge voltage, which enables appropriate detection of the charged state of the battery. Thus, the overcharge inhibitor according to the present invention is effective in control of the battery.

What is claimed is:

1. A nonaqueous electrolyte solution comprising:
   a nonaqueous solvent;
   an electrolyte salt; and
   an overcharge inhibitor comprising a polymerizable monomer as a repeating unit, being represented by the following chemical formula (1):

  (1)

where X is one polymerizable monomer, and has a functional group that is electropolymerized at a potential of 4.3 to 5.5 V based on a lithium metal reference, the functional group having an aromatic group; Y is the other polymerizable monomer, has an ether bond or an ester bond, and may be the X; subscript "a" is an integer number of 1 or more; subscript "b" is 0 or an integer number of 1 or more; and a number average molecular weight of the overcharge inhibitor is in a range of 3000 to 1000000.

2. The nonaqueous electrolyte solution according to claim 1, wherein each of the X and Y has a double bond between carbon atoms.

3. The nonaqueous electrolyte solution according to claim 2, wherein each of the X and Y contains a vinyl group or a propenoate group.

4. The nonaqueous electrolyte solution according to claim 1, wherein each of the X and Y is represented by the following chemical formula (2) or (3):

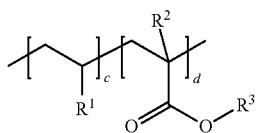
(2)

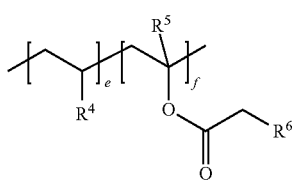
(3)

where each of $R^1$ and $R^4$ is a functional group having an aromatic ring represented by any one of the following chemical formulas (4) to (6); each of $R^2$ and $R^5$ is an alkyl group having the carbon number of 1 to 3 in which a hydrogen atom of the alkyl group may be substituted by a fluorine atom; $R^3$ is a group having an alkyl group having the carbon number of 1 to 6 or an aromatic group in which a hydrogen atom of the alkyl group or aromatic group may be substituted by a fluorine atom, alternatively, $R^3$ may be an alkyl group having the carbon number of 1 to 6 or aromatic group via an alkoxy group represented by the following chemical formula (7); $R^6$ is a functional group having an alkyl group having the carbon number of 1 to 6 or an aromatic ring in which a hydrogen atom of the functional group having the alkyl group or the aromatic group may be substituted by a fluorine atom; each of subscripts "c" and "e" is an integer number of 1 or more; and each of subscripts "d" and "f" is 0 or an integer number of 1 or more;

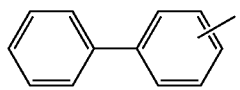
(4)

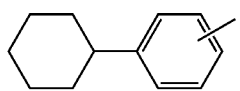
(5)

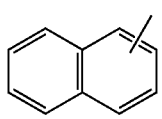
(6)

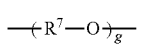
(7)

where $R^7$ is an alkyl group having the carbon number of 2 to 6 or a phenylene group in which a hydrogen atom of the alkyl group or phenylene group may be substituted by a fluorine atom; and subscript "g" is an integer number of 1 to 10.

5. The nonaqueous electrolyte solution according to claim 1, wherein at least one of the X and Y is selected from group consisting of the following chemical formulas (8) to (10):

(8)

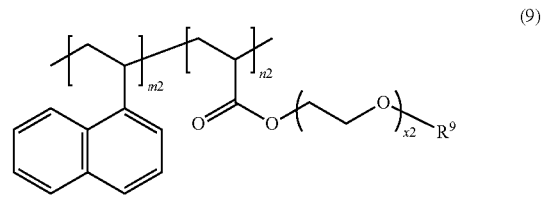
(9)

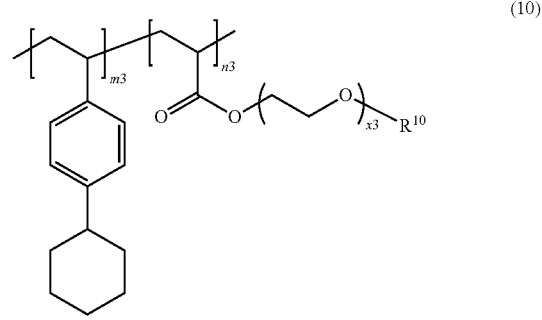
(10)

where each of subscripts "x1 to x3" is an integer number of 1 to 10; each of subscripts "m1 to m3" is an integer number of 1 or more; each of subscripts "n1 to n3" is 0 or an integer number of 1 or more; and each of $R^8$ to $R^{10}$ is a functional group having an alkyl group having the carbon number of 1 to 6 or an aromatic ring in which a hydrogen atom of the functional group having the alkyl group or aromatic group may be substituted by a fluorine atom.

6. The nonaqueous electrolyte solution according to claim 1, wherein at least one of the X and Y is selected from the group consisting of the following chemical formulas (11) to (13):

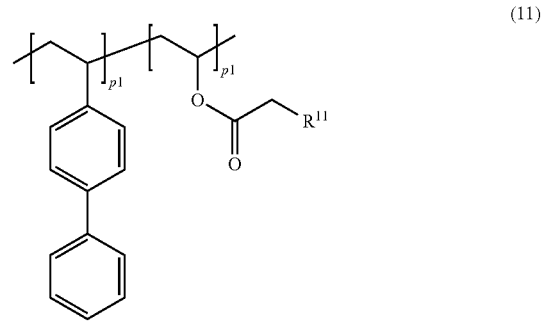
(11)

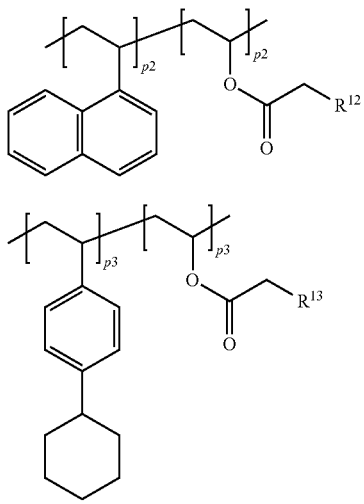
(12)

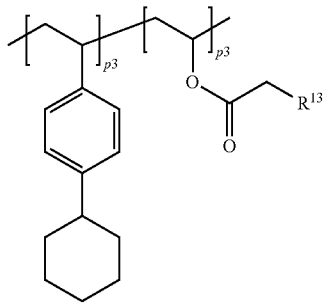
(13)

where each of subscripts "p1 to p3" is an integer number of 1 or more; each of subscripts "q1 to q3" is 0 or an integer number of 1 or more; and each of $R^{11}$ to $R^{13}$ is a functional group having an alkyl group having the carbon number of 1 to 6 or an aromatic ring in which a hydrogen atom of the functional group having the alkyl group or aromatic group may be substituted by a fluorine atom.

7. The nonaqueous electrolyte solution according to claim 1, wherein the electrolyte salt contains a lithium salt.

8. The nonaqueous electrolyte solution according to claim 1, wherein the nonaqueous solvent includes a cyclic carbonate or a chain carbonate.

9. A secondary battery comprising:
   a positive electrode;
   a negative electrode;
   a separator; and
   the nonaqueous electrolyte solution according to claim 1.

10. The secondary battery according to claim 9, wherein the positive electrode and the negative electrode can store and discharge a lithium element.

11. The nonaqueous electrolyte solution according to claim 1,
    wherein the functional group has an aromatic ring represented by any one of the following chemical formulas (4) to (6):

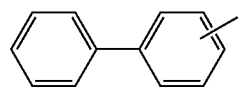
(4)

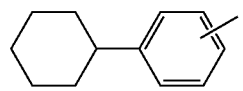
(5)

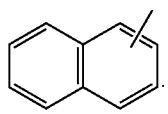
(6)

12. The nonaqueous electrolyte solution according to claim 1,
    wherein a molar ratio of X to Y is 0.1 to 10.

13. The nonaqueous electrolyte solution according to claim 5,
    containing X of 20 to 30% by weight.

* * * * *